US012776611B2

(12) United States Patent
Wang et al.

(10) Patent No.: US 12,776,611 B2
(45) Date of Patent: Oct. 27, 2026

(54) WIRING HARNESS MODULE AND COMBINED WIRING HARNESS

(71) Applicant: JILIN ZHONG YING HIGH TECHNOLOGY CO., LTD., Changchun (CN)

(72) Inventors: Chao Wang, Changchun (CN); Yun Miao, Changchun (CN)

(73) Assignee: JILIN ZHONG YING HIGH TECHNOLOGY CO., LTD., Changchun (CN)

( * ) Notice: Subject to any disclaimer, the term of this patent is extended or adjusted under 35 U.S.C. 154(b) by 317 days.

(21) Appl. No.: 18/290,645

(22) PCT Filed: Jul. 26, 2022

(86) PCT No.: PCT/CN2022/107934
§ 371 (c)(1),
(2) Date: Jan. 19, 2024

(87) PCT Pub. No.: WO2023/005930
PCT Pub. Date: Feb. 2, 2023

(65) Prior Publication Data

US 2024/0258754 A1 Aug. 1, 2024

(30) Foreign Application Priority Data

Jul. 30, 2021 (CN) ......................... 202110876044.0
Jul. 30, 2021 (CN) ......................... 202121766135.0

(51) Int. Cl.
*H01R 31/06* (2006.01)
*H01B 7/00* (2006.01)
*H01R 13/03* (2006.01)

(52) U.S. Cl.
CPC ........... *H01R 31/06* (2013.01); *H01B 7/0045* (2013.01); *H01R 13/03* (2013.01)

(58) Field of Classification Search
CPC ........ H01R 31/04; H01R 31/06; H01R 13/03; H01B 7/0045
(Continued)

(56) References Cited

U.S. PATENT DOCUMENTS 2,218,545 A 10/1940 Morten
6,319,039 B1 11/2001 Chambly
(Continued)

FOREIGN PATENT DOCUMENTS

CN 1691446 A 11/2005
CN 202434959 U 9/2012
(Continued)

OTHER PUBLICATIONS

Supplementary Search Report issued on Jun. 23, 2025 for counterpart Chinese Patent Application No. 202110876044.0, along with machine EN translation, 4 pages.
(Continued)

*Primary Examiner* — Gary F Paumen
(74) *Attorney, Agent, or Firm* — LOZA & LOZA, LLP; Michael Fedrick

(57) ABSTRACT

A wiring harness module and a combined wiring harness, the wiring harness module including a conductor portion and an insulation portion enclosing the conductor portion. The conductor portion includes at least one conductor, each of which is connected to at least one input conductive connector and at least one output conductive connector. An electrical connection of the conductors of different wiring harness modules is realized by connecting the input conductive connector and the output conductive connector of the different wiring harness modules. The combined wiring harness is formed by splicing a plurality of wiring harness modules in accordance with a preset splicing manner, and the conductors of the plurality of wiring harness modules
(Continued)

being electrically connected to each other via the input conductive connector and the output conductive connector. In the present disclosure a complex conductive circuit is combined.

20 Claims, 8 Drawing Sheets

(58) Field of Classification Search
USPC .......................... 439/625, 810, 801, 290, 291
See application file for complete search history.

(56) References Cited

U.S. PATENT DOCUMENTS

| | | | | |
|---|---|---|---|---|
| 7,199,487 | B2 | 4/2007 | Hayes | |
| 7,205,477 | B1 | 4/2007 | Gilliland et al. | |
| 8,647,131 | B1 | 2/2014 | Wiebusch | |
| 2001/0009067 | A1 | 7/2001 | Nagai | |
| 2002/0106944 | A1 | 8/2002 | Yoshinobu et al. | |
| 2016/0254608 | A1* | 9/2016 | Takahashi | C25D 3/38 439/886 |
| 2018/0174716 | A1 | 6/2018 | Kominato et al. | |
| 2019/0126860 | A1 | 5/2019 | Takamatsu et al. | |

FOREIGN PATENT DOCUMENTS

| | | | |
|---|---|---|---|
| CN | 103079896 | A | 5/2013 |
| CN | 104466568 | A | 3/2015 |
| CN | 105449380 | A | 3/2016 |
| CN | 105655824 | A | 6/2016 |
| CN | 106711654 | A | 5/2017 |
| CN | 107683552 | A | 2/2018 |
| CN | 208682766 | U | 4/2019 |
| CN | 109835277 | A | 6/2019 |
| CN | 209881371 | U | 12/2019 |
| CN | 209913199 | U | 1/2020 |
| CN | 210156634 | U | 3/2020 |
| CN | 210897803 | U | 6/2020 |
| CN | 211295415 | U | 8/2020 |
| CN | 211720338 | U | 10/2020 |
| CN | 112204821 | A | 1/2021 |
| CN | 212725736 | U | 3/2021 |
| CN | 213400671 | U | 6/2021 |
| CN | 213460375 | U | 6/2021 |
| CN | 213635424 | U | 7/2021 |
| CN | 113471781 | A | 10/2021 |
| CN | 215771835 | U | 2/2022 |
| CN | 215955591 | U | 3/2022 |
| DE | 10224478 | A1 | 5/2003 |
| GB | 1435899 | A | 5/1976 |
| JP | H0391047 | U | 9/1991 |
| JP | 05033486 | U | 4/1993 |
| JP | 1994351125 | A | 12/1994 |
| JP | H0721845 | A | 1/1995 |
| JP | H07106004 | A | 4/1995 |
| JP | H1075057 | A | 3/1998 |
| JP | 2003323923 | A | 11/2003 |
| JP | 2006073367 | A | 3/2006 |
| JP | 2006092819 | A | 4/2006 |
| JP | 2007305379 | A | 11/2007 |
| JP | 2009240107 | A | 10/2009 |
| KR | 20200085245 | A | 7/2020 |
| KR | 20200123475 | A | 10/2020 |
| WO | 2017222058 | A1 | 12/2017 |
| WO | 2017222073 | A1 | 12/2017 |

OTHER PUBLICATIONS

First Office Action and Search Report issued on Jul. 2, 2025 for counterpart Canadian Application No. 3,225,267, 5 pages.
First Office Action issued on Jun. 24, 2025 for counterpart European Application No. 22848535.5, 10 pages.
Second Office Action issued for corresponding Japanese Patent Application No. 2024-505478 mailed on May 16, 2025, 18 pages.
First Office Action issued on Oct. 14, 2025 for counterpart Vietnam Patent Application No. 1-2024-01464, 4 pages.
Notice of grant issued on Nov. 14, 2025 for corresponding Japanese Patent Application No. 2024-505478, 5 pages.
First Office Action issued for corresponding Japanese Patent Application No. 2024-505478 mailed on Dec. 3, 2024, 16 pages.
International search report issued for counterpart International Patent Application No. PCT/CN2022/107934, mailed on Oct. 24. 2022, 3 pgs.
First Office Action issued on Nov. 30, 2021 for counterpart Chinese Patent Application No. 202110851896.4 with machine EN translation, 3 pgs.
Novelty Search Report issued for counterpart Chinese Patent Application No. 202110851896.4 with its machine EN translation, Mar. 2021, 18 pgs.
First Office Action issued on Aug. 26, 2024 for counterpart Chinese Patent Application No. 202110876044.0, along with machine EN translation downloaded from EPO.
Search Report issued on Aug. 26, 2024 for counterpart Chinese Patent Application No. 202110876044.0, along with machine EN translation downloaded from EPO.
Extended European Search Report issued on Oct. 14, 2024 for counterpart European Patent Application No. 22848535.5.
First Office Action issued on Feb. 27, 2025 for counterpart Korean Patent Application No. 10-2024-7002991, 11 pages.
Second Office Action and search report issued on Mar. 10, 2025 for counterpart Chinese Patent Application No. 202110876044.0, 27 pages.
Examination Report issued on Apr. 22, 2026 for counterpart Indian Patent Application No. 202417013413, 9 pages.
Office Action and Search Report issued on Feb. 12, 2026 for counterpart Brazilian Patent Application No. BR112024001512-2, 8 pages.

* cited by examiner

WIRING HARNESS MODULE AND COMBINED WIRING HARNESS

CROSS REFERENCE TO RELATED APPLICATIONS

The present application is the U.S. national stage of International Patent Application No. PCT/CN2022107934 filed on Jul. 26, 2022, which claims priority to Chinese Patent Application No. 202110876044.0 filed on Jul. 30, 2021, and also claims priority to Chinese Utility Model Patent Application No. 202121766135.0 filed on Jul. 30, 2021, both all of which are hereby incorporated by reference in their entireties.

TECHNICAL FIELD

The present disclosure relates to the technical field of electrical connection, in particular to a wiring harness module and a combined wiring harness.

BACKGROUND

As the electrical functions of transportation such as automobiles, trains and ships become more and more complex, there are more and more corresponding electrical circuits. Correspondingly, there are more and more wiring harness circuits configured to connect the various electrical devices and the power supply. As a result, the wiring harness gradually becomes large and complex. For example, the main wiring harness of the body of a C-class car has about 800-1000 circuits, which are assembled into a large wiring harness and distributed in various positions of the car body. When the wiring harness is partially damaged, the entire wiring harness has to be replaced. In addition, due to reasons such as personalized customization, the circuits and branches of the wiring harness are tended to be made flexible gradually, different types of wiring harnesses need to be produced at the same time, and the methods for large batch production are no longer suitable. Accordingly, a lot of special equipment and technical equipment are added, which requires high requirements for the skills of the production personnel and the wiring harness detection ability. Therefore, it is extremely difficult to produce and maintain complex wiring harnesses.

SUMMARY

The present disclosure provides a wiring harness module and a combined wiring harness to solve the problem of difficult production and maintenance of complex wiring harnesses.

A first aspect embodiment of the present disclosure proposes a wiring harness module including a conductor portion and an insulation portion enclosing the conductor portion, the conductor portion includes at least one conductor, each of which is connected to at least one input conductive connector and at least one output conductive connector, and an electrical connection of the conductors of different wiring harness modules is realized by connecting the input conductive connector and the output conductive connector of the different wiring harness modules.

A second aspect embodiment of the present disclosure provides a combined wiring harness, which is formed by splicing a plurality of wiring harness modules according to the first aspect embodiment in accordance with a preset splicing manner, and the conductors of the plurality of the wiring harness modules are electrically connected to each other via the input conductive connector and the output conductive connector.

The characteristics and advantages of the wiring harness module and the combined wiring harness of the present disclosure include:

1. The wiring harness modules of the present disclosure are configured to be combined into a wiring harness. Since each conductor of each wiring harness module is connected to at least one input conductive connector and at least one output conductive connector, each wiring harness module is connected to at least two other wiring harness modules and each conductor is electrically connected to at least two other conductors, and thus a complex conductive circuit is combined;
2. The wiring harness module of the present disclosure realizes the connection of parallel circuits by providing a plurality of input conductive connectors and/or a plurality of output conductive connectors, so as to reduce the number of wiring harness modules when combined into a complex wiring harness, thereby reducing the volume of the wiring harness and reducing costs;
3. The wiring harness module of the present disclosure realizes the electrical connection between the conductors of different wiring harness modules by, providing a male end pin as the input conductive connector and a female end slot as the output conductive connector, and inserting the male end pin and the female end slot, the structure is simple, and the connection operation is very convenient;
4. The insulation portion of the wiring harness module of the present disclosure is provided with a to-be-spliced surface, and by connecting the insulation portions of different wiring harness modules, the combination and connection of the wiring harness modules are stronger, and the wiring harness modules are not easy to be disconnected or loose from each other, which improves the safety and reliability of the electrical connection;
5. The combined wiring harness of the present disclosure is produced in modular, batched and automated production, and be assembled in a personalized manner, which improves the production efficiency and qualification rate and facilitates maintenance.

BRIEF DESCRIPTION OF THE DRAWINGS

The following drawings are only intended to schematically illustrate and explain the present disclosure, and do not limit the scope of the present disclosure.

In the drawings.

DETAILED DESCRIPTION

In order that the above objectives, features and advantages of the present disclosure are more apparent and understandable, the present disclosure will be further explained with reference to the drawings and the embodiments. Herein, the terms "first", "second", etc. are only used for descriptive purposes and cannot be understood as indicating or implying the relative importance or implicitly indicating the number of the technical features indicated. Therefore, features limited by the terms "first", "second", etc. may include one or more of these features explicitly or implicitly. In the description of the present disclosure, unless otherwise stated, "a plurality of" means two or more. In the description of the present disclosure, unless otherwise stated, the term "connection" should be understood in a broad sense. For example, it may be fixed connection, detachable connection, direct connection, or indirect connection via an intermediate medium. An ordinary skilled person in this field understands the specific meaning of the above terms in this patent according to the specific circumstances.

Figure 1:
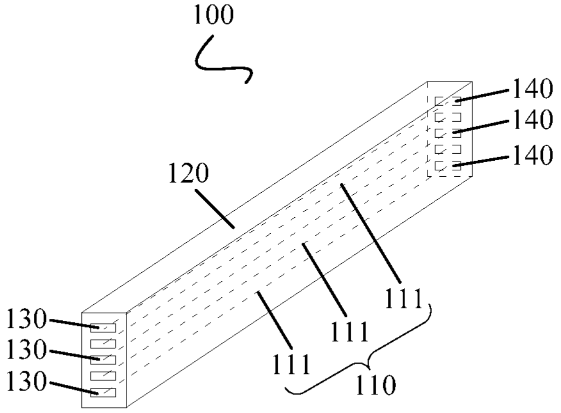
FIG. 1 is a schematic structure diagram of the wiring harness module according to an embodiment of the present disclosure.
Figure 3:
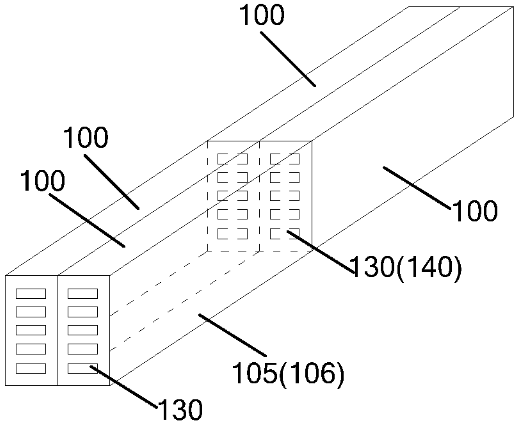
FIG. 3 is a schematic diagram of the wiring harness modules of FIG. 1 being spliced side-by-side and end-to-end.

As shown in FIGS. 1 and 3, the first aspect embodiment of the present disclosure provides a wiring harness module 100 including a conductor portion 110 and an insulation portion 120 enclosing the conductor portion 110, the conductor portion 100 includes at least one conductor 111, each of the conductors 111 is connected to at least one input conductive connector 130 and at least one output conductive connector 140, and the electrical connection of the conductors 111 of different wiring harness modules 100 is realized by connecting the input conductive connector 130 and the output conductive connector 140 of the different wiring harness modules 100.

The wiring harness modules according to the present disclosure are configured to be combined into a wiring harness. Since each conductor 111 of each wiring harness module 100 is connected to at least one input conductive connector 130 and at least one output conductive connector 140, each wiring harness module is connected to at least two other wiring harness modules and each conductor is electrically connected to at least two other conductors, and thus a complex conductive circuit is combined.

Figure 2:
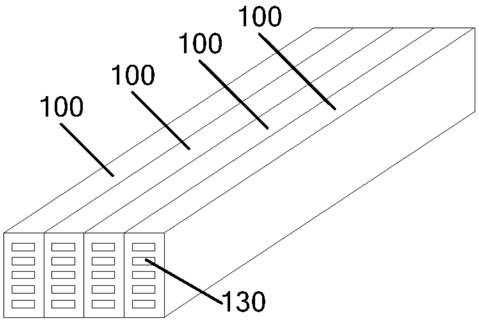
FIG. 2 is a schematic diagram of the wiring harness modules of FIG. 1 being spliced side-by-side.
Figure 5:
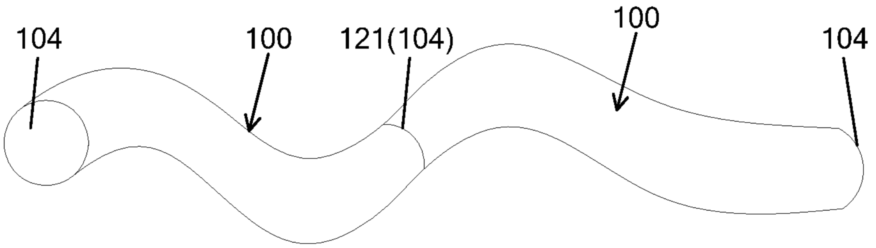
FIG. 5 is a schematic diagram of the wiring harness modules of FIG. 4 being spliced end-to-end.

As shown in FIGS. 2, 3 and 5, when a wiring harness is assembled, the conductors of a plurality of wiring harness modules are connected via the input conductive connector 130 and the output conductive connector 140 (see FIG. 3) based on the desired wiring harness conductive circuit. The combination way is flexible, and the assembly and detachment are easy. During maintenance, only the damaged wiring harness modules need to be detached, and there is no need to replace the entire wiring harness or the entire group of wiring harnesses, thereby reducing the costs of the production and maintenance.

Taking a combination of three wiring harness modules 100 as an example, the three wiring harness modules 100 are respectively a first wiring harness module, a second wiring harness module and a third wiring harness module. When they are combined, the output conductive connector 140 of the first wiring harness module is connected to the input conductive connector 130 of the second wiring harness module, and the output conductive connector 140 of the second wiring harness module is connected to the input conductive connector 130 of the third wiring harness module, thereby achieving the electrical connection of the three wiring harness modules 100 in sequence.

The wiring harness module according to the present disclosure may be produced in batched and automated production, and be assembled in a personalized manner, thereby improving the production efficiency and qualification rate.

Further, the cross-sectional area of the conductor 111 is 0.1 $mm^2$-260 $mm^2$. In a wiring harness, the cross-sectional area of the conductor 111 determines the current conducted by the. In general, the conductor 111 realizing signal conduction has a small current and a small cross-sectional area. For example, the minimum cross-sectional area of the signal line conductor 111 of an automobile wiring harness may reach 0.1 $mm^2$. In contrast, the conductor 111 realizing power supply conduction has a large current and a large cross-sectional area. For example, the maximum cross-sectional area of the conductor 111 of an automobile battery wiring harness may reach 260 $mm^2$. For conductors 111 with a small cross-sectional area, the conductors 111 may be arranged by being laid using a wire feeder. For conductors 111 with a large cross-sectional area, 3D printed conductors 111 may be used or the shaped conductors 111 may be laid directly.

Further, the material of the insulation portion 120 is one or more of polyvinyl chloride, polyurethane, nylon, polypropylene, a silicone rubber, cross-linked polyolefin, a synthetic rubber, a polyurethane elastomer, cross-linked polyethylene, and polyethylene.

Further, the breakdown strength of the insulation portion 120 is 0.3 KV/mm-35 KV/mm. Breakdown strength is also called dielectric breakdown strength, representing the highest electric field strength that a material can withstand under the action of an electric field to avoid damage (breakdown). When the breakdown strength of the insulation portion 120 is lower than 0.3 KV/mm, some thin insulation portions 120 are likely to be broken down under the normal voltage, thereby leading to ineffective insulation. When the breakdown strength of the insulating portion 120 is higher than 35 KV/mm, since a high voltage higher than 35 KV does not occur in a general in-vehicle environment, the use of a material with too high breakdown strength will increase the cost of the integrated wiring harness modules and cause design waste.

Further, the thickness of the insulation portion 120 is 0.03 mm-5 mm. If the thickness of the insulation portion 120 is less than 0.03 mm, not only the breakdown voltage of the insulation portion 120 cannot be guaranteed to be higher than the working voltage, but also the wear resistance of the insulation portion 120 cannot be guaranteed. After being scraped for a plurality of times, the insulation portion 120 may be damaged, and the conductor 111 is exposed, resulting in situations such as leakage or short circuit, thereby causing circuit damage and functional failure. If the thickness of the insulation portion 120 is equal to 5 mm, the breakdown voltage, insulation resistance and wear resistance of the insulation portion 120 are all meet the requirements. However, when the thickness is greater than 5 mm, the thickness of the insulation portion 120 is large, and problems such as gas holes and collapse may occur during machining processing, which reduces the performance of the insulation portion 120, waste the material of the insulation portion 120, and increase the processing procedures and time. Therefore, the thickness of the insulation part 120 is selected to be 0.03 mm-5 mm.

As shown in FIGS. 1 to 3, in one embodiment, the conductor portion 110 includes a plurality of conductors 111 insulated to each other, in which each conductor 111 is connected to at least one input conductive connector 130 and at least one output conductive connector 140. That is, each wiring harness module 100 has a plurality of conductors 111 insulated to each other, and each conductor 111 transmits different currents and signals, so that instruction information is transmitted to the electricity-consumption to facilitate the combination into a complex wiring harness. When the wiring harness modules are combined into a complex wiring harness, the number of wiring harness modules 100 spliced side-by-side is reduced, the volume of the complex wiring harness is reduced, the structure of the complex wiring harness is simplified, thereby further reducing the cost of the wiring harness.

Figure 15:
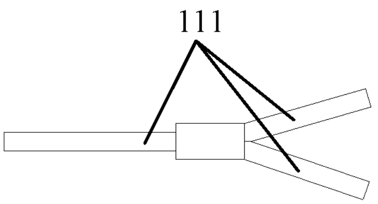
FIG. 15 is a schematic diagram of the conductor of the wiring harness module according to a first embodiment of the present disclosure.
Figure 16:
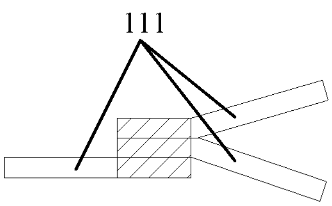
FIG. 16 is a schematic diagram of the conductor of the wiring harness module according to a second embodiment of the present disclosure.
Figure 17:
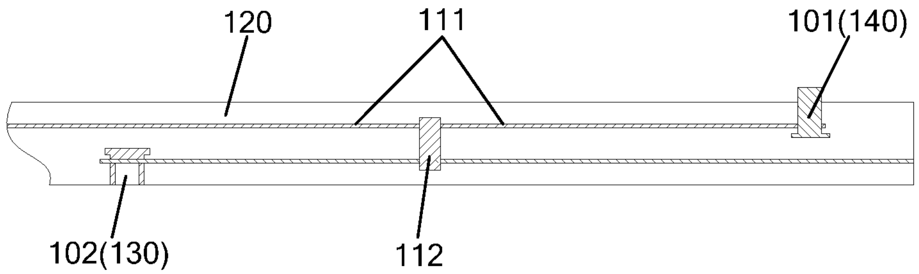
FIG. 17 is a schematic diagram of the conductor of the wiring harness module according to a third embodiment of the present disclosure.

In one embodiment, each conductor 111 of the conductor portion 110 may be an integrated structure, or a sectional structure formed by connecting a plurality of segments of the conductor together, in which the plurality of segments of the conductor may be connected to each other by a terminal (as shown in FIG. 15), or by welding (as shown in FIG. 16), or by drilling a hole into the insulation portion 120 and pouring a conductive material into the hole (as shown in FIG. 17).

Figure 13:
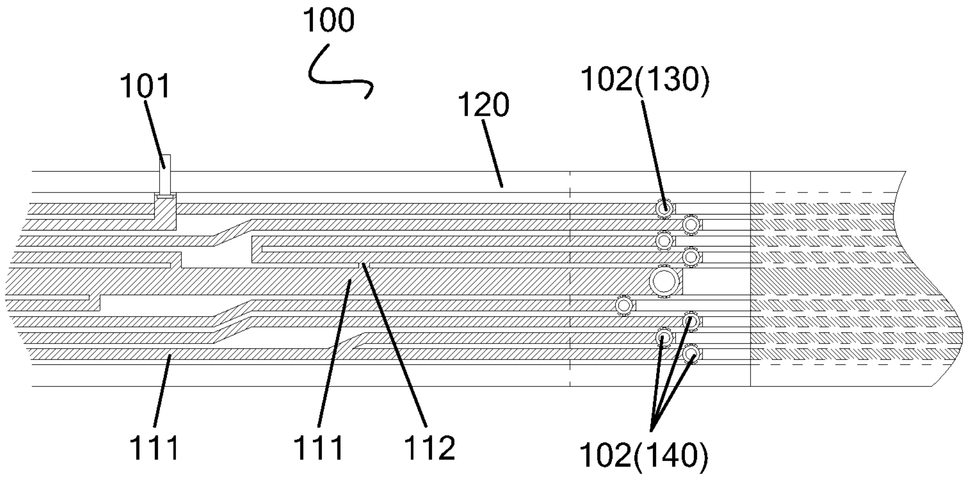
FIG. 13 is a top view of the wiring harness module in FIG. 12.

In one embodiment, the conductor portion 110 includes a connecting segment 112 via which at least two conductors 111 are electrically connected. When two or more conductors need to conduct the currents or signals in the same one circuit, these conductors 111 need to be electrically connected, as shown in FIGS. 13 and 17. By providing the connecting segment 112, different conductors 111 is electrically connected, thereby reducing the circuits in the electrical devices, optimizing the electrical layout, and reducing the volume of the wiring harness.

Furthermore, the connecting segment 112 is connected to the two ends or the middle part of the conductor 111 by crimping or welding.

In one embodiment, each conductor 111 has one or more input contacts, each of which is connected to one input conductive connector 130; and each conductor 111 has one or more output contacts, each of which is connected to one output conductive connector 140.

Please refer to FIG. 13. In a first feasible technical solution, each conductor 111 has a plurality of input contacts and one output contact. The plurality of input contacts is respectively connected to one input conductive connector 130, that is, each conductor 111 is connected to a plurality of input conductive connectors 130 and one output conductive connector 140. When the plurality of input conductive connectors 130 are electrically connected to a plurality of other conductors respectively, the connection of a parallel circuit is realized.

Please refer to FIG. 13. In a second feasible technical solution, each conductor 111 has one input contact and a plurality of output contacts. The plurality of output contacts is respectively connected to one output conductive connector 140, that is, each conductor 111 is connected to one input conductive connector 130 and a plurality of output conductive connectors 140. When the plurality of output conductive connectors 140 are electrically connected to a plurality of other conductors respectively, the connection of a parallel circuit is realized.

Please refer to FIG. 13. In a third feasible technical solution, each conductor 111 has a plurality of input contacts and a plurality of output contacts. The plurality of input contacts is respectively connected to one input conductive connector 130, and the plurality of output contacts are respectively connected to one output conductive connector 140, that is, each conductor 111 is connected to a plurality of input conductive connectors 130 and a plurality of output conductive connectors 140. When the plurality of input conductive connectors 130 are electrically connected to a plurality of other conductors respectively and the plurality of output conductive connectors 140 are connected to a plurality of other conductors respectively, the connection of a parallel circuit is realized.

Figure 14:
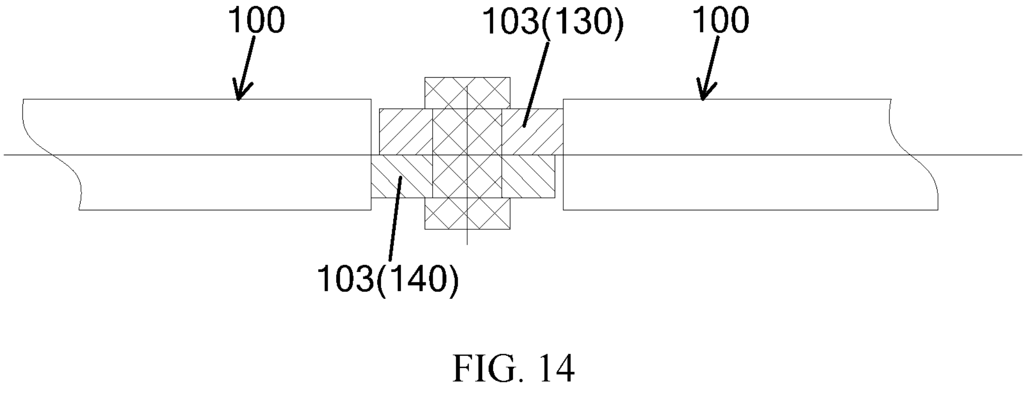
FIG. 14 is a schematic diagram of another connection method of different wiring harness modules according to the present disclosure.

As shown in FIG. 14, in another specific embodiment, the input conductive connector 130 and the output conductive connector 140 are both butting connectors 103 protruding from the insulation portion 120, and an electrical connection between the conductors 111 of different wiring harness modules 100 is realized by lapping joint and fixing the butting connectors 103 of the different wiring harness modules 100. For example, the butting connectors 103 of the different wiring harness modules 100 are detachably connected to each other by means of a bolt.

Figure 7:
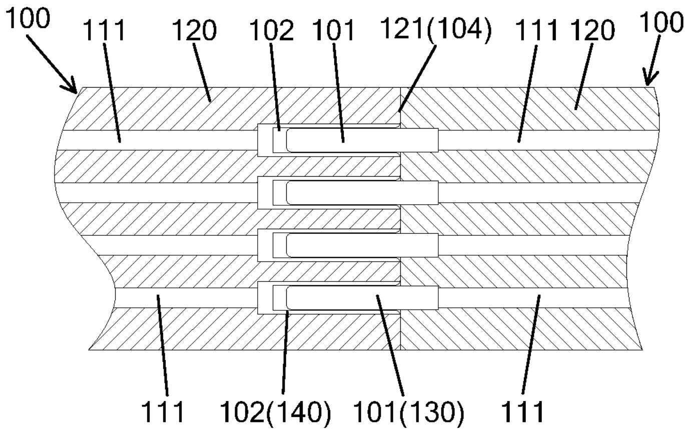
FIG. 7 is a schematic diagram of a connection method of different wiring harness modules according to the present disclosure.

As shown in FIGS. 7 and 14, in one embodiment, at least one of the input conductive connector 130 and the output conductive connector 140 protrudes from the insulation portion 120 to facilitate the connection between the input conductive connector 130 and the output conductive connector 140 of different wiring harness modules 100.

Figure 8:
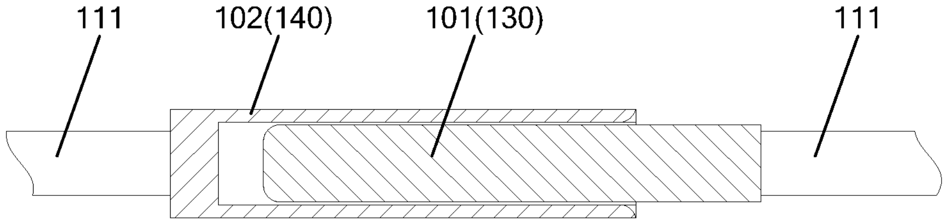
FIG. 8 is a schematic diagram of the plug-in between the male end pin and the female end slot in FIG. 7 according to an embodiment.

As shown in FIGS. 7 to 13, in one specific embodiment, one of the input conductive connector 130 and the output conductive connector 140 is a male end pin 101 protruding from the insulation portion 120, while the other one is a female end slot 102 provided to be concave in the insulation portion 120, and an electrical connection of the conductors 111 of different wiring harness modules 100 is realized by inserting the male end pin 101 and the female end slot 102 of the different wiring harness modules 100 (as shown in FIG. 8). The structure is simple, and the connection operation is very convenient.

Figure 9:
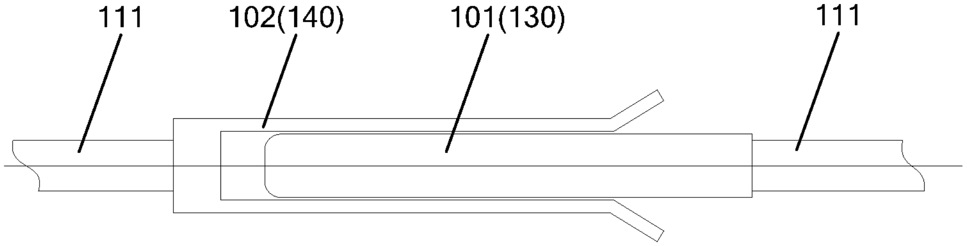
FIG. 9 is a schematic diagram of the plug-in between the male end pin and the female end slot in FIG. 7 according to another embodiment.

In order to facilitate the plug-in (insertion connection) of the male end pin 101 and the female end slot 102, an externally expanded guide bevel may be provided at an end of the male end pin 101 (as shown in FIG. 9).

Figure 10:
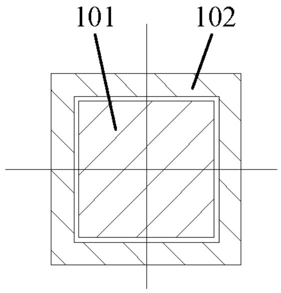
FIG. 10 is a schematic structure diagram of the male end pin and the female end slot in FIG. 7.
Figure 11:
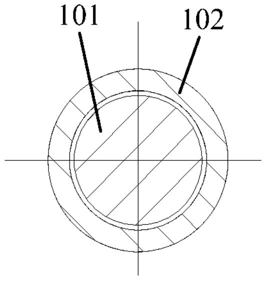
FIG. 11 is another schematic structure diagram of the male end pin and the female end slot in FIG. 7.

The shape of the male end pin 101 matches the shape of the female end slot 102, and their cross-sectional shapes may be square (as shown in FIG. 10) or circular (as shown in FIG. 11).

In one embodiment, at least a part of the male end pin 101 and/or of the female end slot 102 has a plating layer thereon to improve the corrosion resistance, improve the conductivity, and increase the number of times of plug-in (insertion connections), so that the service life of the male end pin 101 and the female end slot 102 may be better extended.

The plating layer may be provided on the male end pin 101 and the female end slot 102 by electroplating, chemical plating, magnetron sputtering or vacuum plating.

Electroplating is a process of plating a thin layer of another metals or alloys on certain metal surfaces using the principle of electrolysis.

Chemical plating is a process of deposition of metals through controllable redox reactions under the catalytic action of the metals.

Magnetron sputtering is a process of causing electrons to move spirally near the target surface by the interaction between the magnetic field and the electric field, thus increasing the probability of electrons hitting the argon to generate ions. The generated ions collide with the target face under the action of the electric field and the target material is sputtered.

Vacuum plating is a process of deposition of various metallic and non-metallic thin-films on surfaces of molded parts by distillation or sputtering under vacuum conditions.

The material of the plating layer is one or more of gold, silver, nickel, tin, zinc, a tin-lead alloy, a silver-antimony alloy, palladium, a palladium-nickel alloy, graphite-silver, graphene-silver, and a silver-gold-zirconium alloy. Copper, as an active metal, oxidizes with oxygen and water during use, so one or more inactive metals are needed as the plating layer to extend the service life of the male end pin 101 and the female end slot 102. In addition, for the male end pin 101 and the female end slot 102 that need to be subjected to frequent insertion and pull-out, better wear-resistant metals are also required as the plating layer, which may greatly increase the service life of the male end pin 101 and the female end slot 102. The male end pin 101 and the female end slot 102 also need to have good conductivity. The conductivity and stability of the above-mentioned metals are all better than those of copper or copper alloys, which enable the male end pin 101 and the female end slot 102 to have better electrical performance and longer service life.

In order to prove the impact of different plating layer materials on the overall performance of the male end pin 101 and the female end slot 102, the inventor has carried out a series of tests for the number of times of insertion and pull-out and corrosion resistance time, using male end pin 101 and female end slot 102 samples of the same specification and material but with different plating layer materials. In order to prove the advantages and disadvantages of the selected materials and other common electroplating materials, the inventor also selected tin, nickel and zinc as the plating layer materials in the tests. The test results are shown in Table 1 below.

The number of times of insertion and pull-out in Table 1 below is obtained by fixing the male end pin 101 and the female end slot 102 on the test bench respectively, and using a mechanical device to simulate the insertion and pull-out for the male end pin 101 and the female end slot 102. After every 100 times of insertion and pull-out, the test is paused to observe the situation of damage to the surface plating layer of the male end pin 101 and the female end slot 102. If the surface plating layer is scratched and the material of the male end pin 101 and the female end slot 102 is exposed, the test is stopped, and the number of times of insertion and pull-out at that time is recorded. If the number of times of insertion and pull-out is less than 8000, it is considered unqualified.

The corrosion resistance time test in Table 1 below is conducted by placing the male end pin 101 and the female end slot 102 into a salt mist spray test chamber, and spraying a salt mist to all positions of the male end pin 101 and the female end slot 102, and taking out and cleaning them to observe the surface corrosion situation every 20 hours, i.e., one cycle, until the surface corrosion area of the male end pin 101 and the female end slot 102 exceeds 10% of their total area, and then stopping the test and recording the number of cycles at that time. In this embodiment, if the number of cycles is less than 80, it is considered unqualified.

TABLE 1

Effects of different plating layer materials on the number of times of insertion and pull-out and corrosion resistance of the male end pin and the female end slot

| Different plating layer materials | | | | | | | | | | | |
|---|---|---|---|---|---|---|---|---|---|---|---|
| gold | silver | silver-antimony alloy | graphite silver | graphene silver | Silver-gold-zirconium alloy | tin | nickel | palladium | palladium-nickel alloy | tin-lead alloy | zinc |
| Number of times of insertion and pull-out (time) | | | | | | | | | | | |
| 12400 | 11800 | 12200 | 12500 | 12700 | 13100 | 8200 | 8300 | 11000 | 12100 | 9800 | 8500 |

TABLE 1-continued

| Effects of different plating layer materials on the number of times of insertion and pull-out and corrosion resistance of the male end pin and the female end slot | | | | | | | | | | | |
|---|---|---|---|---|---|---|---|---|---|---|---|
| Number of corrosion resistance test cycles (cycle) | | | | | | | | | | | |
| 135 | 128 | 125 | 130 | 127 | 133 | 86 | 88 | 111 | 118 | 111 | 84 |

As can be seen from the above table, when the plating layer material is selected to be gold, silver, a silver-antimony alloy, palladium, a palladium-nickel alloy, graphite silver, graphene silver and a silver-gold-zirconium alloy, the test results exceed the standard value more and the performance is relatively stable. When the plating layer material is selected to be nickel, tin, a tin-lead alloy and zinc, the test results can also meet the requirements. Therefore, the inventor selects the plating layer material to be one or a combination of more of gold, silver, nickel, tin, a tin-lead alloy, zinc, a silver-antimony alloy, palladium, a palladium-nickel alloy, graphite silver, graphene silver and a silver-gold-zirconium alloy.

In one embodiment, the plating layer includes an underlying layer and a surface layer. A multi-layer plating method is used to generate the plating layer. After the male end pin 101 and the female end slot 102 are processed, there are still many gaps and holes thereon under the micro-interface of the surface. These gaps and holes are the biggest cause to the wear and corrosion of the male end pin 101 and the female end slot 102 during use. Therefore, it is necessary to first plate the surfaces of the male end pin 101 and the female end slot 102 with an underlying layer of the plating layer to fill the gaps and holes thereon, so that the surfaces of the male end pin 101 and the female end slot 102 are smooth without holes, and then plate their surfaces with a surface layer of the plating layer to make the bonding stronger and smoother. The surface of the plating layer has no gap or hole, so that the male end pin 101 and the female end slot 102 have better wear resistance, corrosion resistance and electrical performance, which greatly extends the service life of the male end pin 101 and the female end slot 102.

In one embodiment, the material of the underlying layer is one or more of gold, silver, nickel, tin, a tin-lead alloy, and zinc; and the material of the surface layer is one or more of gold, silver, nickel, tin, a tin-lead alloy, a silver-antimony alloy, palladium, a palladium-nickel alloy, graphite silver, graphene silver, and a silver-gold-zirconium alloy.

In another embodiment, the thickness of the underlying layer is 0.01 μm-15 μm. Optionally, the thickness of the underlying layer is 0.1 μm-9 μm.

In another embodiment, the thickness of the surface layer is 0.5 μm-55 μm. Optionally, the thickness of the surface layer is 1 μm-35 μm.

In order to prove the impact of the change in the thickness of the underlying layer of the plating layer on the overall performance of the male end pin 101 and the female end slot 102, the inventor carried out a series of tests for temperature rise and corrosion resistance time using male end pin 101 and female end slot 102 samples of the same specification and material with the same thickness of surface layer of silver-plating but different thicknesses of underlying layer of nickel-plating. The test results are shown in Table 2 below.

The temperature rise test in Table 2 below is conducted by applying the same current to the male end pin 101 and the female end slot 102 after insertion, and detecting the temperatures of the male end pin 101 and the female end slot 102 at the same position before power-on and after the temperature is stable in a closed environment, and then taking an absolute value of its difference. In this embodiment, if the temperature rise is greater than 50 K, it is considered unqualified.

The corrosion resistance time test in Table 2 below is conducted by placing the male end pin 101 and the female end slot 102 into a salt mist spray test chamber, and spraying a salt mist to all positions of the male end pin 101 and the female end slot 102, and taking out and cleaning them to observe the surface corrosion situation every 20 hours, i.e., one cycle, until the surface corrosion area of the male end pin 101 and the female end slot 102 exceeds 10% of their total area, and then stopping the test and recording the number of cycles at that time. In this embodiment, if the number of cycles is less than 80, it is considered unqualified.

TABLE 2

| Effects of different thicknesses of underlying layer on the temperature rise and corrosion resistance of the male end pin and the female end slot | | | | | | | | | | | | | | | |
|---|---|---|---|---|---|---|---|---|---|---|---|---|---|---|---|
| Different thicknesses of the underlying layer of nickel-plating (μm) | | | | | | | | | | | | | | | |
| 0.001 | 0.005 | 0.01 | 0.05 | 0.1 | 0.5 | 1 | 3 | 5 | 6 | 9 | 11 | 13 | 15 | 17 | 19 |
| Temperature rise of the male end pin and the female end slot (k) | | | | | | | | | | | | | | | |
| 10.5 | 12.3 | 14.9 | 16.6 | 18.2 | 21.9 | 24.6 | 26.7 | 28.6 | 31.3 | 35.9 | 40.5 | 43.5 | 47.7 | 58.1 | 67.4 |
| Number of corrosion resistance test cycles (cycle) | | | | | | | | | | | | | | | |
| 68 | 78 | 82 | 93 | 105 | 109 | 113 | 118 | 120 | 124 | 128 | 129 | 130 | 130 | 128 | 127 |

As can be seen from Table 2 above, when the thickness of the underlying layer of nickel-plating is less than 0.01 μm, although the temperature rise of the male end pin 101 and the female end slot 102 is qualified, since the plating layer is too thin, the number of corrosion resistance cycles of the male end pin 101 and the female end slot 102 is less than 80, which does not meet the performance requirements for the male end pin 101 and female end slot 102. This has a great impact on the overall performance and the service life of the male end pin 101 and the female end slot 102. In severe situations, this may cause a sudden reduction in product life or even failure and combustion accidents. When the thickness of the underlying layer of nickel-plating is greater than 15 μm, since the underlying layer is too thick, the heat generated by the male end pin 101 and the female end slot 102 cannot be dissipated, making the temperature rise of the male end pin 101 and the female end slot 102 unqualified. Moreover, a thick plating layer will easily fall off from the surface of the male end pin 101 and the female socket 102, resulting in a decrease in the number of corrosion resistance cycles. Therefore, the inventor selects the thickness of the bottom layer to be 0.01 μm-15 μm. Preferably, the inventor found that when the thickness of the underlying layer is 0.1 μm-9 μm, the comprehensive effect of temperature rise and corrosion resistance of the male end pin 101 and the female end slot 102 is better. Therefore, in order to further improve the safety and reliability of the product itself, optionally, the thickness of the underlying layer is 0.1 μm-9 μm.

In order to prove the impact of the change in the thickness of the surface layer of the plating layer on the overall performance of the male end pin 101 and the female end slot 102, the inventor carried out a series of tests the temperature rise and corrosion resistance time using male end pin 101 and female end slot 102 samples of the same specification and material with the same thickness of underlying layer of nickel-plating but different thicknesses of surface layer of silver-plating. The test results are shown in Table 3 below.

The test method is the same as the test method described above.

TABLE 3

Effects of different thicknesses of surface layer on the temperature rise and corrosion resistance

| Different thicknesses of surface layer of silver-plating (μm) | | | | | | | | | | | | | | | | |
|---|---|---|---|---|---|---|---|---|---|---|---|---|---|---|---|---|
| 0.1 | 0.5 | 1 | 1.5 | 5 | 10 | 15 | 20 | 25 | 30 | 35 | 40 | 45 | 50 | 55 | 60 | 65 |
| Temperature rise of the male end pin and the female end slot (k) | | | | | | | | | | | | | | | | |
| 11.4 | 13.7 | 15.2 | 17.5 | 21.8 | 23.6 | 25.3 | 28.6 | 31.8 | 35.5 | 38.9 | 42.7 | 45.3 | 48.4 | 49.5 | 53.9 | 69.6 |
| Number of corrosion resistance test cycles (cycle) | | | | | | | | | | | | | | | | |
| 74 | 82 | 91 | 93 | 95 | 97 | 98 | 102 | 105 | 109 | 113 | 117 | 119 | 121 | 125 | 124 | 121 |

As can be seen from Table 3 above, when the thickness of the surface layer of silver-plating is less than 0.5 μm, although the temperature rise of the male end pin 101 and the female end slot 102 is qualified, since the plating layer is too thin, the number of corrosion resistance cycles of the male end pin 101 and the female end slot 102 is less than 80, which does not meet the performance requirements for the male end pin 101 and female end slot 102. This has a great impact on the overall performance and the service life of the male end pin 101 and the female end slot 102. In severe situations, this may cause a sudden reduction in product life or even failure and combustion accidents. When the thickness of the surface layer of silver-plating is greater than 55 μm, since the surface layer is too thick, the heat generated by the male end pin 101 and the female end slot 102 cannot be dissipated, making the temperature rise of the male end pin 101 and the female end slot 102 unqualified. Moreover, a thick plating layer will easily fall off from the surface of the male end pin 101 and the female end slot 102, resulting in a decrease in the number of corrosion resistance cycles. Besides, since the metal of the surface layer is relatively expensive, the use of a thicker plating layer does not increase the performance and has no use value. Therefore, the inventor selects the thickness of the surface layer to be 0.1 μm-55 μm.

Optionally, the inventor found that when the thickness of the surface layer is 1 μm-35 μm, the comprehensive effect of temperature rise and corrosion resistance of the male end pin 101 and the female end slot 102 is better. Therefore, in order to further improve the safety and reliability of the product itself, optionally, the thickness of the surface layer is 1 μm-35 μm.

In one embodiment, the conductor 111 and the input conductive connector 130 are electrically connected by crimping, welding or integral forming, and the conductor 111 and the output conductive connector 140 are electrically connected by crimping, welding or integral forming.

Crimping is a production process in which the input conductive connector 130 or the output conductive connector 140 is assembled with the conductor 111, and then the two are stamped into one integrated unit using a crimping machine. The advantage of crimping lies in mass production. Stable quality products can be rapidly and massively produced by using chain terminals and automatic crimping machines.

Welding includes one or more of friction welding, ultrasonic welding, arc welding, laser welding and resistance welding.

Friction welding refers to a method of welding that uses the heat generated by friction on the contact surface of a workpiece as a heat source to cause plastic deformation of the workpiece under the action of pressure.

Ultrasonic welding is a method in which high-frequency vibration waves are transmitted to the surfaces of two objects to be welded, and the surfaces of the two objects rub against each other to form fusion between molecular layers under pressurization.

Arc welding refers to a method that uses the electric arc as a heat source and converts electrical energy to the thermal energy and mechanical energy required for welding by the physical phenomenon of air discharge, thereby achieving the purpose of connecting metals. The main methods include shielded metal arc welding, submerged arc welding, gas shielded welding, etc.

Laser welding is an efficient and precise welding method that uses high-energy-density laser beams as a heat source.

Resistance welding refers to a method that uses a strong current to pass through the contact between an electrode and a workpiece, and generates heat by the contact resistance to achieve welding.

Integrated forming refers to directly forming the input conductive connector 130 or the output conductive connector 140 on the conductor 111, without a need to further perform the connection processing between the conductor 111 and, the input conductive connector 130 or the output conductive connector 140, thereby saving the processing procedures and improving the production efficiency.

As shown in FIG. 7, in one embodiment, the insulation portion 120 has a to-be-spliced surface 121, and a connection of the insulation portions 120 of different wiring harness modules 100 is realized by splicing the to-be-spliced surfaces 121 of the different wiring harness modules 100.

In this embodiment, not only the conductors 111 of different wiring harness modules 100 are connected via the input conductive connector 130 and the output conductive connector 140, but also the insulation portions 120 of the different wiring harness modules 100 are connected, so that the combination and connection of the wiring harness modules are stronger, the wiring harness modules are not easy to disconnect to each other, and thus the safety and reliability of the electrical connection are improved.

As shown in FIG. 7, in a first specific embodiment, the insulation portion 120 has two end surfaces 104 oppositely arranged in a lengthwise direction of the wiring harness module 100, and the to-be-spliced surface 121 includes at least one end face 104. That is, the end face of the wiring harness module 100 is spliced with the insulation portion of other wiring harness modules. For example, the end face of two wiring harness modules 100 are spliced to achieve end-to-end splicing of the wiring harness modules 100, thereby extending the wiring harness to form a branch wiring harness of a combined wiring harness.

Figure 12:
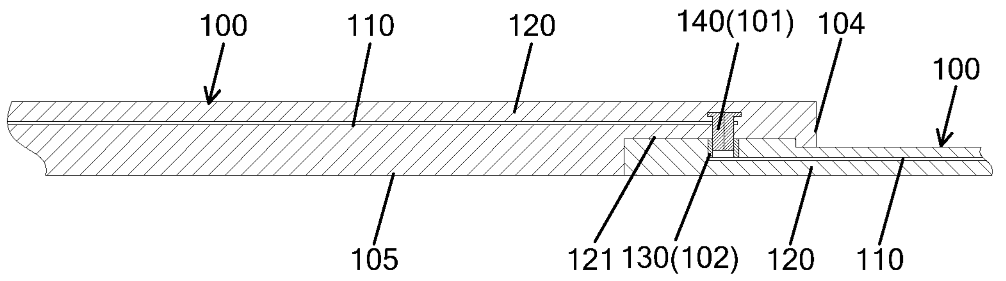
FIG. 12 is a schematic diagram of the side splicing of different wiring harness modules according to the present disclosure.

As shown in FIG. 12, in a second specific embodiment, the insulation portion 120 has a side circumferential face 105 arranged in a circumferential direction of the wiring harness module 100, and the to-be-spliced surface 121 includes at least a partial area of the side circumferential face 105. That is, the side face of the wiring harness module is spliced with the insulation portion of other wiring harness modules. For example, the side faces of two wiring harness modules 100 are spliced to achieve side-by-side splicing of the wiring harness modules 100, thereby widening the wiring harness to form the trunk wiring harness of a combined wiring harness.

For example, as shown in FIGS. 1, 2 and 3, the insulation portion 120 is in the shape of a quadrangular prism, the insulation portion 120 has four side faces, and the to-be-spliced surface 121 includes at least a partial area of at least one of the side face, such as including two, three or four side faces. For another example, the insulation portion 120 is in the shape of a triangular prism, the insulation portion 120 has three side faces, and the to-be-spliced surface 121 includes at least a partial area of at least one of the side face, such as including two or three side faces.

Figure 4:
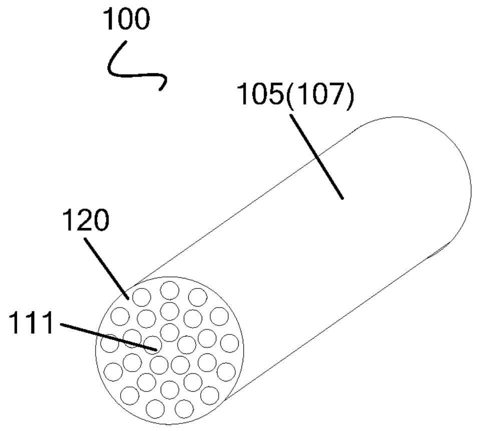
FIG. 4 is a schematic structure diagram of the wiring harness module according to another embodiment of the present disclosure.

In this embodiment, further, the side circumferential face 105 of the insulation portion 120 includes a flat face 106 (as shown in FIG. 3), the to-be-spliced surface 121 includes at least a partial area of the flat face 106, and/or the side circumferential face 105 includes a curved face 107 (as shown in FIG. 4), and the to-be-spliced surface 121 includes at least a partial area of the curved face 107.

For example, when the shape of the insulation portion 120 is a triangular prism or a quadrangular prism, its side circumferential face 105 is a flat face 106 (as shown in FIG. 3); and when the shape of the insulation portion 120 is a cylinder, its side circumferential face 105 is a curved face 107 (as shown in FIG. 4).

The above-mentioned first specific embodiment and second specific embodiment may be implemented separately or in combination.

As shown in FIGS. 19 to 23, in one embodiment, a splice fixture member 150 is provided at the to-be-spliced surface 121 of the insulation portion 120 or at an adjacent surface of the to-be-spliced surface 121. The to-be-spliced surfaces 121 of different wiring harness modules 100 are fixed relative to each other through the connection between the splice fixture members 150 of them, that is, the insulation portions 120 of the different wiring harness modules 100 are fixedly connected by the splice fixture members 150 to prevent loosening during use.

In one embodiment, the splice fixture member 150 is an adhesive layer, a magnetic member, a plug-in connector (insertion connection member), a snap-in member, a bolt structure, a rivet structure, a welding member, a bundling member or a locking member.

In a first feasible technical solution, the splice fixture member 150 is an adhesive layer, which is provided on the to-be-spliced surface 121, and the to-be-spliced surfaces 121 of different wiring harness modules 100 are fixedly connected by adhesion.

In a second possible technical solution, the splice fixture member 150 is a magnetic member, which is provided on the to-be-spliced surface 121. The to-be-spliced surfaces 121 of different wiring harness modules 100 are magnetically connected by the magnetic member. The connection is convenient and fast, and is mainly used in environments that do not require high bonding strength between the wiring harness modules.

Figure 22:
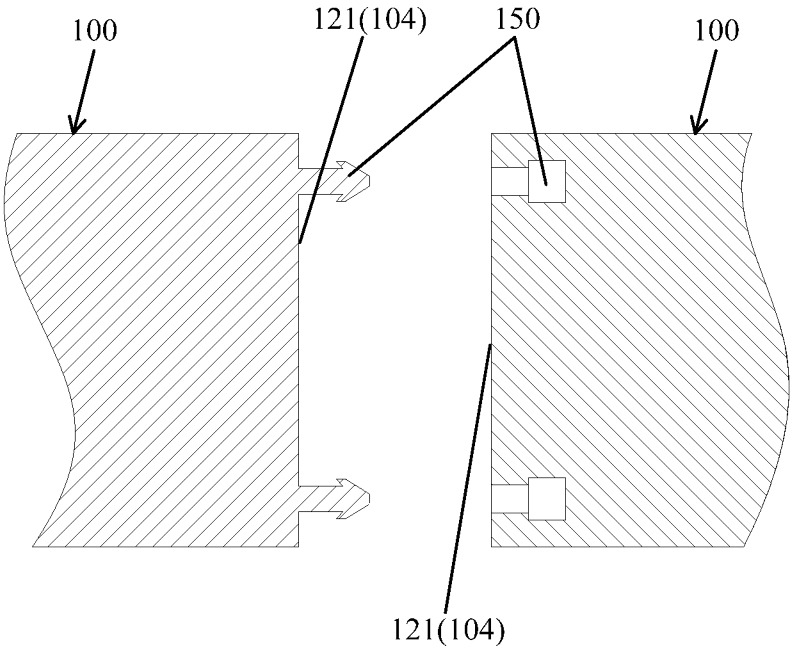
FIG. 22 is a schematic structure diagram of the provision of a splicing fixture member on the wiring harness module according to another embodiment of the present disclosure.
Figure 23:
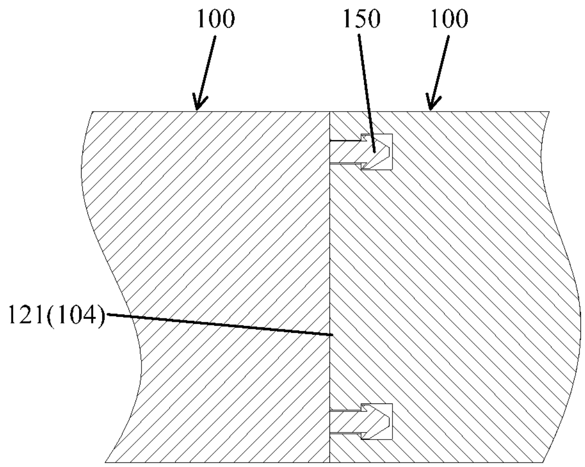
FIG. 23 is a schematic diagram of the connection status between the two wiring harness modules in FIG. 22.

In a third feasible technical solution, the splice fixture member 150 is a plug-in connector (insertion connection member). As shown in FIGS. 22 and 23, a pin is provided on one to-be-spliced surface 121, and a slot is provided on the other to-be-spliced surface 121. The pin is inserted into the slot and then fixed so that the to-be-spliced surfaces 121 of different wiring harness modules 100 are fixedly connected.

In a fourth feasible technical solution, the splice fixture member 150 is a snap-in member. A jaw is provided on one to-be-spliced surface 121, and a jaw-slot is provided on the other to-be-spliced surface 121. The jaw and the jaw-slot are assembled and fixed such that the to-be-spliced surfaces 121 of different wiring harness modules 100 are fixedly connected.

In a fifth feasible technical solution, the splice fixture member 150 is a bolt structure. The bolt structure includes a bolt and a nut. The bolt is fixed on one to-be-spliced surface 121, and the nut is provided on the other to-be-spliced surface 121 and is rotatable; or, the nut is fixed on one to-be-spliced surface 121, and the bolt is provided on the other to-be-spliced surface 121 and is rotatable. After the bolt and the nut are bolted connected and tightened, the to-be-spliced surfaces 121 of different wiring harness modules 100 are fixedly connected. The minimum bolt structure is an M3 bolt and nut, and the minimum torque when the bolt structure is tightened is 0.2 Nm.

In a sixth feasible technical solution, the splice fixture member 150 is a rivet structure, including a rivet and fixture holes. The fixture holes are provided on two to-be-spliced surfaces 121, the rivet passes through the fixture holes, and the end of the rivet that passes through the fixture holes is deformed to tighten the fixture holes, so that the to-be-spliced surfaces 121 of different wiring harness modules 100 are fixedly connected.

In a seventh feasible technical solution, the splice fixture member 150 is a welding member. The welding members are provided on two to-be-spliced surfaces 121. A welding machine is used to fuse and connect the welding members together, so that the to-be-spliced surfaces 121 of different wiring harness modules 100 are fixed connected. The welding machine includes a hot fusion welding machine and an ultrasonic welding machine.

Figure 6:
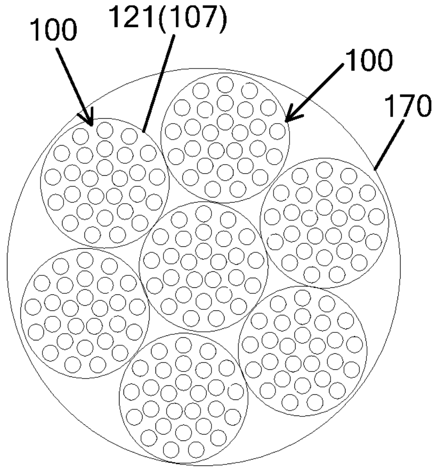
FIG. 6 is a schematic diagram of the wiring harness modules of FIG. 4 being spliced side-by-side.

In an eighth feasible technical solution, the splice fixture member 150 is a bundling member. A notch is provided on the to-be-spliced surfaces 121. The bundling member is used to bundle the to-be-spliced surfaces 121 together at the position of the notch, so that the to-be-spliced surfaces 121 of different wiring harness modules 100 are fixedly connected. The bundling member includes a cable tie, a pipe collar, a coupler lock, etc. As shown in FIG. 6, this solution is suitable for use when the wiring harness modules 100 are spliced side-by-side.

Figure 19:
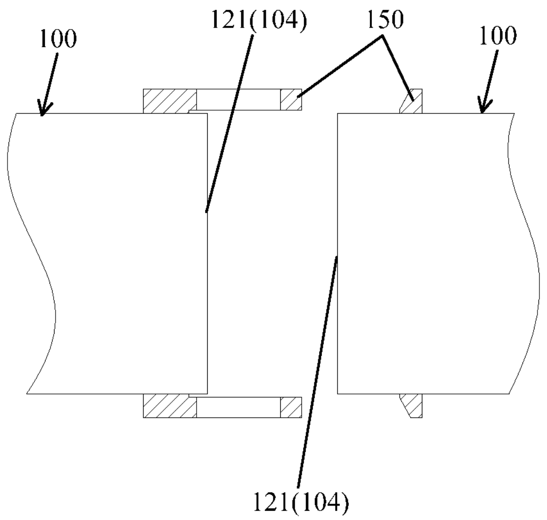
FIG. 19 is a schematic structure diagram of the provision of a splicing fixture member on the wiring harness module according to an embodiment of the present disclosure.
Figure 20:
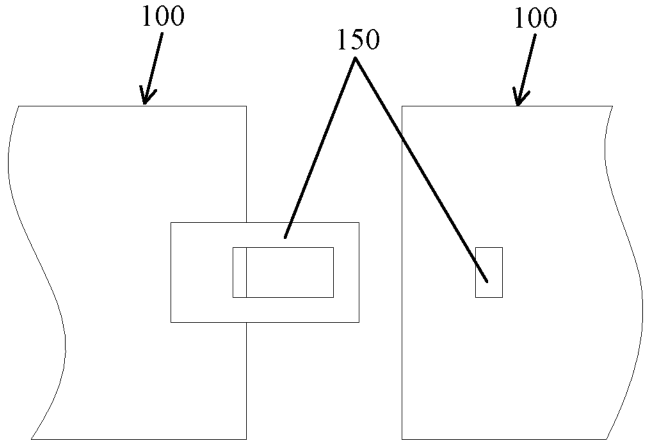
FIG. 20 is a side view of the wiring harness module in FIG. 19.
Figure 21:
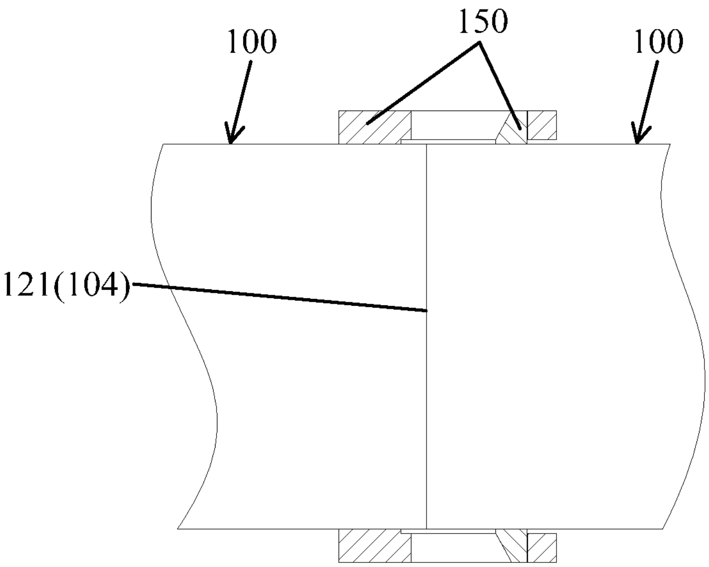
FIG. 21 is a schematic diagram of the connection status between the two wiring harness modules in FIG. 19.

In a ninth feasible technical solution, the splice fixture member 150 is a locking member. The locking member is provided at an adjacent surface of the to-be-spliced surface 121 (as shown in FIGS. 19 to 21), or is provided on the to-be-spliced surface 121 (as shown in FIGS. 22 and 23), and the to-be-spliced surfaces 121 of different wiring harness modules 100 are fixed by snap-in connection of the locking member.

In one embodiment, the separating force applied to separate the to-be-spliced surfaces 121 after being spliced is at least 0.5N. In different use environments and for different wiring harness modules 100, the requirements for the bonding force between the wiring harness modules 100 are different. In order to ensure that different wiring harness modules 100 cannot be unnecessarily separated due to misoperation or vibration, the inventor sets the separating force applied to separate the to-be-spliced surfaces 121 after being spliced to be at least 0.5 N.

As shown in FIGS. 7 and 12, in one embodiment, the input conductive connector 130 and the output conductive connector 140 are provided at the to-be-spliced surface 121. That is, the places of the different wiring harness modules 100 where the conductors are connected and the insulation portions are connected are in the same area. This further improves the reliability of the electrical connection and makes the splicing operation of the wiring harness modules faster.

For example, when the input conductive connector 130 and the output conductive connector 140 are the male end pin 101 and the female end slot 102 respectively, both the male end pin 101 and the female end slot 102 are provided on the to-be-spliced surface 121. When two wiring harness modules 100 are spliced, while the male end pin 101 and the female end slot 102 of the two wiring harness modules 100 are connected by insertion, the to-be-spliced surfaces 121 of the two wiring harness modules 100 are also in contact and fixed together. The operation is very simple and convenient, and the assembly efficiency is improved.

In one embodiment, the wiring harness module has a lengthwise direction. The insulation portion 120 has two end faces 104 (as shown in FIG. 5) oppositely provided in the lengthwise direction of the wiring harness module 100, and a side circumferential face 105 (as shown in FIG. 12) provided in a circumferential direction of the wiring harness module 100. At least one input conductive connector 130 is provided at one end face 104 or at the side circumferential face 105, and at least one output conductive connector 140 is provided at one end face 104 or at the side circumferential face 105.

For example, the input conductive connector 130 and the output conductive connector 140 are provided on the side circumferential face 105 of the insulation portion 120, or the input conductive connector 130 is provided on the side circumferential face 105 of the insulation portion 120 and the output conductive connector 140 is provided on an end face of the insulation portion 120, or the input conductive connector 130 and the output conductive connector 140 are provided on the two end faces of the insulation portion 120 respectively, in order to realize a variety splicing manners for different wiring harness module.

In one embodiment, the material of the insulation portion 120 is a flexible material to make the wiring harness have flexibility. For example, the material of the insulation portion 120 is one or a combination of more of polyvinyl chloride, polyurethane, nylon, polypropylene, a silicone rubber, cross-linked polyolefin, a synthetic rubber, a polyurethane elastomer, cross-linked polyethylene, and polyethylene.

In one embodiment, the insulation portion 120 is formed by one or more processes of extrusion, injection molding, spraying, dipping molding, slush molding, electrophoresis, braiding, and winding, and wraps the conductor portion 110.

In one embodiment, the conductor 111 is a solid conductor, a multi-core stranded wire, conductive foil or a flat-shaped cable. In cases where the shape of the wiring harness module 100 is simple and the current conducted is large, a solid conductor may be used as the conductor 111, which is not easily deformed but has a large conduction area and conducts a larger current. In cases where the wiring harness module 100 has a complex shape or often needs to be bent, a multi-core stranded wire may be used as the conductor 111, which is soft, windable, and not easy to break. When the space for installation of the wiring harness module 100 is small or when it is installed in a narrow environment, conductive foil or a flat-shaped cable may be used as the conductor 111, which reduces the height of the wiring harness module 100 as much as possible, and facilitates the installation, and also facilitates the heat dissipation of the conductor 111.

In one embodiment, the material of the conductor 111 is one or a combination of more of a metal, a conductive ceramic, a carbon-containing conductor, a solid electrolyte, a mixed conductor and a conductive polymer material.

In one embodiment, the material of the conductor 111 is nickel or an alloy thereof, cadmium or an alloy thereof, zirconium or an alloy thereof, chromium or an alloy thereof, cobalt or an alloy thereof, manganese or an alloy thereof, aluminum or an alloy thereof, tin or an alloy thereof, titanium or an alloy thereof, zinc or an alloy thereof, copper or an alloy thereof, silver or an alloy thereof, and gold or an alloy thereof. Optionally, the material of the conductor 111 is copper or a copper alloy or aluminum or an aluminum alloy. The conductor material of a copper has good conductivity and good malleability, and thus is the first choice of the cable conductor material. However, as the price of copper continues to rise, the cost of using a copper material as the material of the conductor will become higher and higher. For this reason, people began to look for alternatives to the metal copper to reduce the cost. The content of the metal aluminum in the earth's crust is about 7.73%. After the refining technology is optimized, the price of it is relatively low. Compared with copper, aluminum is lighter in weight and has the conductivity that is second only to copper. Aluminum can replace a part of copper in the field of electrical connection. Therefore, replacing copper with aluminum is a development trend in the field of electrical connection in automobiles.

In other embodiments, other non-metallic materials may also be used as the conductor 111, such as graphene in the carbon-containing conductors, which is also an excellent conductor material.

Figure 18:
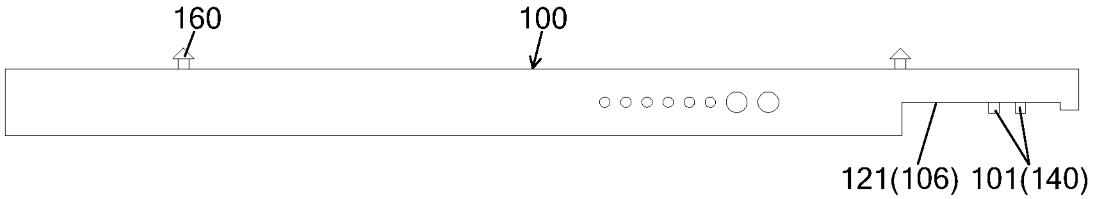
FIG. 18 is a schematic structure diagram of the provision of a wiring harness fixture member on the wiring harness module according to the present disclosure.

As shown in FIG. 18, in one embodiment, the outer wall of the insulation portion 120 is provided with a wiring harness fixture member 160 for fixed connection with a base configured to support the wiring harness. For example, the wiring harness module 100 is fixed to an installation position such as a sheet metal of the automobile, etc. by the wiring harness fixture member 160. For example, the wiring harness fixture member 160 is fixed to the installation position by snap-in connection, screwed connection or plug-in connection.

In one embodiment, the cross-sectional shape of the wiring harness module 100 is circular or elliptical or rectangular or polygonal or E-shaped or F-shaped or H-shaped or K-shaped or L-shaped or T-shaped or U-shaped or V-shaped or W-shaped or X-shaped, or Y-shaped, or Z-shaped, or semi-arc-shaped, or arc-shaped or wavy-shaped. In the lengthwise direction of the wiring harness module 100, it can extend along a straight line, or bend and extend along a curved line. Designing the cross-section of the wiring harness module 100 to have various shapes facilitates the designers to select wiring harness modules 100 with different shapes of cross-sections based on the actual arrangement environments, thereby reducing the volume of the wiring harness module 100, optimizing the assembly environment for the wiring harness module 100, and improving the safety of the wiring harness module 100.

In one embodiment, a shielding layer is further provided on the periphery of or inside the insulation portion 120 of the wiring harness module 100. For example, the shielding layer is a braided layer of threads or a wrapping layer of foil. The shielding layer may reduce the electromagnetic interference from itself or from the outside world, thus ensuring the signal stability and improving the stability of the wiring harness module 100.

As shown in FIGS. 2, 3, 5 and 12, the second aspect embodiment of the present disclosure provides a combined wiring harness, which is formed by splicing a plurality of wiring harness modules 100 of the first aspect embodiment in accordance with a preset splicing manner. The conductors 111 of the plurality of wiring harness modules 100 are electrically connected to each other via the input conductive connector 130 and the output conductive connector 140. The structures of the plurality of wiring harness modules 100 may be the same or different.

Other structures and beneficial effects of the combined wiring harness of the second aspect embodiment may be the same as those of the wiring harness module 100 of the first aspect embodiment, and thus will not be repeated here again.

The combined wiring harness of the present disclosure is made up of wiring harness modules 100 spliced to each other, and is easy to assemble and disassemble. During maintenance, only the damaged wiring harness modules need to be detached, and there is no need to replace the entire wiring harness or the entire group of wiring harnesses. Thus the production and maintenance costs are reduced.

The combined wiring harness of the present disclosure is modularly produced and assembled in a personalized manner, which improves both the production efficiency and the qualification rate.

In one embodiment, the preset splicing manner includes at least one of a transverse splicing manner and a longitudinal splicing manner, the longitudinal splicing manner is splicing in a longitudinal direction parallel with a lengthwise direction of the wiring harness module, and the transverse splicing manner is splicing in a transverse direction perpendicular to the lengthwise direction of the wiring harness module.

In one embodiment, the present splicing manner includes the transverse splicing manner and the longitudinal splicing manner, the trunk wiring harness section of the combined wiring harness is formed by the transverse splicing manner, and the branch wiring harness sections of the combined wiring harness are formed by the longitudinal splicing manner.

Figure 24:
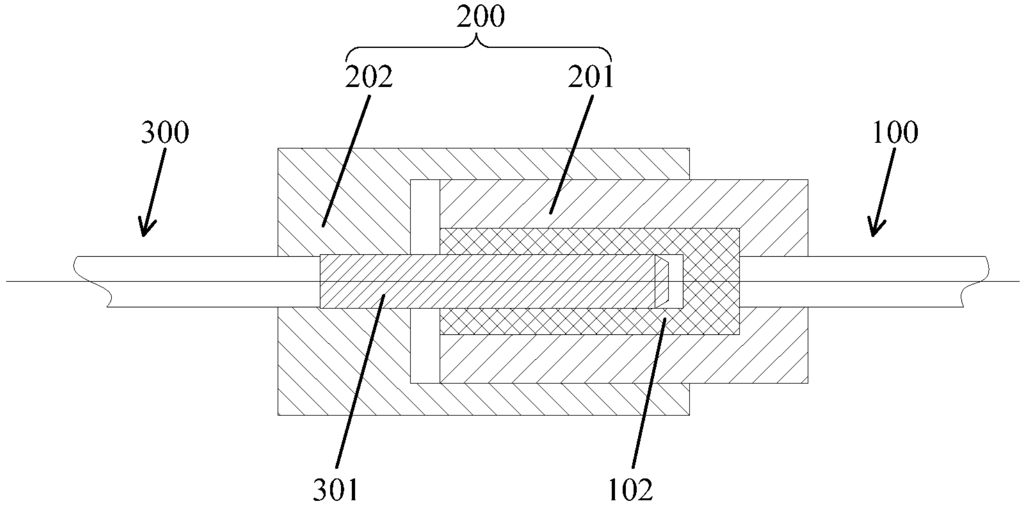
FIG. 24 is a schematic diagram of the connection between the wiring harness module and the connector of an electricity-consumption device via an insertion sheath module according to the present disclosure.

As shown in FIG. 24, in one embodiment, the wiring harness module located at the outermost end of the combined wiring harness is connected to an insertion sheath module 200, so as to be connected with the connector 300 of an electricity-consumption device by plug-in via the insertion sheath module 200. To be specific, the insertion sheath module includes a male sheath 201 and a female sheath 202. For example, the male sheath 201 is provide to sleeve the outside of the wiring harness module 100, and the female sheath 202 is provided to sleeve the outside of the connector 300 of the electricity-consumption device. When the female end slot 102 of the wiring harness module 100 is connected with the male terminal 301 of the connector 300 of the electricity-consumption device by plug-in, the male sheath 201 and the female sheath 202 are also connected by plug-in, and thus an electrical connection between the combined wiring harness and the electricity-consumption device is realized.

Compared with the prior art, the combined wiring harness according to the present disclosure has at least the following advantages:

1. The combined wiring harness is made up of wiring harness modules that are spliced to each other. The wiring harness modules can be produced in batched and automated, with high production efficiency and high qualification rate;
2. In general, at the time of installation of a wiring harness, there are many functional parts that need to be installed in advance, which hinders the subsequent installation of the wiring harness, wastes labor costs, and makes the assembly process complex. However, when the combined wiring harness of the present disclosure is assembled, the wiring harness modules may be installed one by one and step by step, which bypasses the functional parts installed in advance, so that the installation of the wiring harness and the assembly of the functional parts become simple and convenient, thereby saving the workshop assembly man-hours and improving the production efficiency;
3. When the wiring harness assembly is damaged, the damaged wiring harness modules may be directly replaced without a need to replace the entire wiring harness, which not only saves the maintenance man-hours but also reduces the maintenance costs;
4. When there are many wiring harness circuits, wiring harness modules may be added in a radial direction of the wiring harness to increase wiring harness circuits, and the combination may be performed in a variety of ways to save costs and installation time;
5. The wiring harness modules may be designed and produced based on a shape that resembles the shape of the installation position and assembly position, so that during final assembly, it can be directly installed to match the installation position and assembly position, thereby saving the installation man-hours and reducing the number of fixture members used during installation;
6. The wiring harness modules may be configured with flexible conductors and insulators, so that when there is displacement deformation of the installation position for the wiring harness, the flexible wiring harness modules may be used to greatly reduce the damage to the wiring harness caused by the displacement deformation of the installation position, thereby improving the safety of the wiring harness;
7. By using wiring harness modules that can be spliced to each other, the wiring harness modules in different physical areas may be replaced based on the wiring harness configuration, while the wiring harness modules in other physical installation areas do not need to be replaced because the circuits are the same. In this way, the current situation that the same wiring harness assembly with different functional configurations needs to be re-manufactured completely is solved, which saves a lot of production resources and lays the foundation for the hardware of wiring harnesses.

The above are only exemplary specific embodiments of the present invention, and are not tending to limit the scope of the present invention. Any equivalent changes and modifications made by a person skilled in the art without departing from the conception and principles of the present disclosure shall fall within the scope of protection of the present disclosure. It should also be noted that the constituent parts of the present disclosure are not limited to the disclosure as a whole described above. The technical features described in the description of the present disclosure may be used individually or in combination based on actual needs, so the present disclosure naturally covers other combinations and specific disclosures related to the invention point in this case.

The invention claimed is:

1. A wiring harness module, wherein the wiring harness module comprises a conductor portion and an insulation portion enclosing the conductor portion, the conductor portion comprises a plurality of conductors insulated from each other, each of which is connected to at least one input conductive connector and at least one output conductive connector, and an electrical connection of the conductors of different wiring harness modules is realized by connecting the input conductive connector and the output conductive connector of the different wiring harness modules, wherein each conductor has a plurality of input contacts, the plurality of input contacts is respectively connected to one input conductive connector, and when the plurality of input conductive connectors connected to each of the conductors is electrically connected to a plurality of other conductors respectively, the connection of a parallel circuit is realized; and/or each conductor has a plurality of output contacts, the plurality of output contacts is respectively connected to one output conductive connector, and when the plurality of output conductive connectors connected to each of the conductors is electrically connected to a plurality of other conductors respectively, the connection of a parallel circuit is realized, wherein the wiring harness module has a lengthwise direction, the insulation portion has two end surfaces oppositely provided in the lengthwise direction of the wiring harness module and a side circumferential face is provided in a circumferential direction of the wiring harness module, and wherein at least one of the input conductive connectors is provided at the side circumferential face and at least one of the output conductive connectors is provided at the side circumferential face.

2. The wiring harness module according to claim 1, wherein the conductor portion comprises a connecting segment, via which at least two conductors are electrically connected.

3. The wiring harness module according to claim 1, wherein at least one of the input conductive connector and the output conductive connector protrudes from the insulation portion.

4. The wiring harness module according to claim 3, wherein the input conductive connector and the output conductive connector are both butting connectors protruding from the insulation portion, and an electrical connection of the conductors of different wiring harness modules is realized by lapping joint and fixing the butting connectors of the different wiring harness modules.

5. The wiring harness module according to claim 1, wherein one of the input conductive connectors and the output conductive connectors is a male end pin protruding from the insulation portion, while the other one is a female end slot provided to be concave in the insulation portion, and an electrical connection of the conductors of different wiring harness modules is realized by inserting the male end pin and the female end slot into a male end pin and a female end slot of a different wiring harness modules.

6. The wiring harness module according to claim 5, wherein at least a part of the male end pin and/or the female end slot has a plating layer thereon.

7. The wiring harness module according to claim 6, wherein a material of the plating layer is one or more of gold, silver, nickel, tin, zinc, a tin-lead alloy, a silver-antimony alloy, palladium, a palladium-nickel alloy, graphite silver, graphene silver, and a silver-gold-zirconium alloy.

8. The wiring harness module according to claim 6, wherein the plating layer comprises an underlying layer and a surface layer.

9. The wiring harness module according to claim 8, wherein:

a material of the underlying layer is one or more of gold, silver, nickel, tin, a tin-lead alloy, and zinc; or a material of the surface layer is one or more of gold, silver, nickel, tin, a tin-lead alloy, a silver-antimony alloy, palladium, a palladium-nickel alloy, graphite-silver, graphene-silver, and a silver-gold-zirconium alloy; or a thickness of the underlying layer is 0.01 μm-15 μm; or a thickness of the underlying layer is 0.1 μm-9 μm; or a thickness of the surface layer is 0.5 μm-55 μm; or a thickness of the surface layer is 1 μm-35 μm.

10. The wiring harness module according to claim 1, wherein the conductor and the input conductive connector are electrically connected by crimping, welding or integral forming, and the conductor and the output conductive connector are electrically connected by crimping, welding or integral forming.

11. The wiring harness module according to claim 1, wherein the insulation portion has a to-be-spliced surface, and a connection of the insulation portions of different wiring harness modules is realized by splicing the to-be-spliced surfaces of the different wiring harness modules together.

12. The wiring harness module according to claim 11, wherein the to-be-spliced surface comprises at least one end face of the insulation portion.

13. The wiring harness module according to claim 11, wherein the to-be-spliced surface comprises at least a partial area of the side circumferential face.

14. The wiring harness module according to claim 13, wherein the side circumferential face comprises a flat face and the to-be-spliced surface comprises at least a partial area of the flat face, and/or the side circumferential face comprises a curved face, and the to-be-spliced surface comprises at least a partial area of the curved face.

15. The wiring harness module according to claim 11, wherein a splice fixture member is provided at the to-be-spliced surface or at an adjacent surface of the to-be-spliced surface, and the to-be-spliced surfaces of different wiring harness modules are fixed relative to each other by a connection of the splice fixture members of them.

16. The wiring harness module according to claim 15, wherein the splice fixture member is an adhesive layer, a magnetic member, a plug-in connector, a snap-in member, a bolt structure, a rivet structure, a welding member, a bundling member or a locking member.

17. The wiring harness module according to claim 11, wherein a separating force applied to separate the to-be-spliced surfaces after being spliced is at least 0.5 N.

18. The wiring harness module according to claim 11, wherein the input conductive connector and the output conductive connector are provided at the to-be-spliced surface.

19. The wiring harness module according to claim 1, wherein:

a material of the insulation portion is a flexible material; or the conductor is a solid conductor, a multi-core stranded wire, conductive foil or a flat-shaped cable; or an outer wall of the insulation portion is provided with a wiring harness fixture member for fixed connection with a base supporting a wiring harness; or a cross-sectional shape of the wiring harness module (100) is circular, elliptical, rectangular, polygonal, E-shaped, F-shaped, H-shaped, K-shaped, L-shaped, T-shaped, U-shaped, V-shaped, W-shaped, X-shaped, Y-shaped, Z-shaped, semi-arc-shaped, arc-shaped or wavy-shaped; or a material of the conductor is one or a combination of more of a metal, a conductive ceramic, a carbon-containing conductor, a solid electrolyte, a mixed conductor and a conductive polymer material; or a shielding layer is provided on the periphery of or inside the insulation portion.

20. A combined wiring harness, wherein the combined wiring harness is formed by splicing wiring harness modules according to claim 1 in accordance with a preset splicing manner, and the conductors of a plurality of the wiring harness modules are electrically connected to each other via the input conductive connector and the output conductive connector.

* * * * *